United States Patent
Takeda et al.

(10) Patent No.: US 11,310,830 B2
(45) Date of Patent: Apr. 19, 2022

(54) TERMINAL, RADIO BASE STATION, RADIO COMMUNICATION METHOD, AND SYSTEM FOR A PHYSICAL UPLINK SHARED CHANNEL AND SOUNDING REFERENCE SIGNAL

(71) Applicant: NTT DOCOMO, INC., Tokyo (JP)

(72) Inventors: Kazuki Takeda, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 23 days.

(21) Appl. No.: 16/890,516

(22) Filed: Jun. 2, 2020

(65) Prior Publication Data

US 2020/0296768 A1    Sep. 17, 2020

Related U.S. Application Data

(63) Continuation of application No. 16/069,579, filed as application No. PCT/JP2017/004018 on Feb. 3, 2017, now Pat. No. 10,708,948.

(30) Foreign Application Priority Data

Feb. 4, 2016    (JP) ................................. 2016-020217

(51) Int. Cl.
*H04W 74/08* (2009.01)
*H04W 16/14* (2009.01)
(Continued)

(52) U.S. Cl.
CPC ....... *H04W 74/0808* (2013.01); *H04L 5/0044* (2013.01); *H04L 5/0048* (2013.01);
(Continued)

(58) Field of Classification Search
CPC ............. H04W 74/0808; H04W 16/14; H04W 72/042; H04W 72/14; H04W 74/0816;
(Continued)

(56) References Cited

U.S. PATENT DOCUMENTS 10,425,825 B2   9/2019   Yang et al.
2016/0278049 A1   9/2016   Nory et al.
(Continued)

FOREIGN PATENT DOCUMENTS

WO    2016/028103 A1    2/2016
WO    2016/148835 A1    9/2016

OTHER PUBLICATIONS

Office Action issued in European Application No. 17747572.0; dated Aug. 21, 2020 (6 pages).
(Continued)

*Primary Examiner* — Mewale A Ambaye
(74) *Attorney, Agent, or Firm* — Osha Bergman Watanabe & Burton LLP

(57) ABSTRACT

A terminal is disclosed that includes a transmitter that transmits a physical uplink shared channel (PUSCH) and a measurement reference signal (sounding reference signal (SRS)) and a processor that performs sensing and controls to contiguously transmit the PUSCH and the SRS after the sensing. In other aspects, a radio communication method and a base station are disclosed.

5 Claims, 10 Drawing Sheets

(51) Int. Cl.
  *H04L 5/00* (2006.01)
  *H04L 27/00* (2006.01)
  *H04L 25/02* (2006.01)
  *H04W 72/04* (2009.01)
  *H04W 72/14* (2009.01)

(52) U.S. Cl.
  CPC ........ *H04L 5/0051* (2013.01); *H04L 25/0228* (2013.01); *H04L 27/0006* (2013.01); *H04W 16/14* (2013.01); *H04W 72/042* (2013.01); *H04W 72/14* (2013.01); *H04L 5/001* (2013.01)

(58) Field of Classification Search
  CPC .... H04W 72/04; H04W 28/12; H04L 5/0044; H04L 5/0048; H04L 5/0051; H04L 25/0228; H04L 5/001; H04L 5/0053
  See application file for complete search history.

(56) References Cited

U.S. PATENT DOCUMENTS

| | | | |
|---|---|---|---|
| 2017/0238190 A1* | 8/2017 | Yang | H04L 5/0048 370/329 |
| 2018/0205526 A1 | 7/2018 | Kim et al. | |
| 2019/0150193 A1 | 5/2019 | Harada et al. | |
| 2019/0320463 A1 | 10/2019 | Yamada et al. | |
| 2019/0342045 A1* | 11/2019 | Radulescu | H04W 74/0808 |
| 2020/0022167 A1* | 1/2020 | Manolakos | H04W 4/029 |
| 2020/0229081 A1* | 7/2020 | Ang | H04W 72/0453 |
| 2020/0336973 A1* | 10/2020 | Niu | H04L 5/0053 |
| 2021/0076391 A1* | 3/2021 | Davydov | H04L 5/0057 |

OTHER PUBLICATIONS

Samsung; "Discussion on UL transmission for LAA"; 3GPP TSG RAN WG1 Meeting #81, R1-152872; Fukuoka, Japan; May 25-29, 2015 (5 pages).
ZTE; "UL framework for LAA"; 3GPP TSG RAN WG1 Meeting #83, R1-156994; Anaheim, USA; Nov. 15-22, 2015 (6 pages).
NTT Docomo, Inc.; "Discussion on SRS design for eLAA UL"; 3GPP TSG RAN WG1 Meeting #84, R1-160948; St Julian's, Malta; Feb. 15-19, 2016 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62 RP-131701; Busan, Korea; Dec. 3-6, 2013 (3 pages).
International Search Report issued in PCT/JP2017/004018 dated Mar. 28, 2017 (2 pages).
Written Opinion issued in PCT/JP2017/004018 dated Mar. 28, 2017 (3 pages).
Extented European Search Report issued in counterpart European Patent Application No. 17747572.0, dated Nov. 15, 2018 (11 Pages).
Office Action issued in counterpart European Patent Application No. 17747572.0, dated May 31, 2019 (7 Pages).
Notification of Reasons for Refusal issued in counterpart Japanese Patent Application No. 2016-020217, dated Mar. 28, 2017 (9 Pages).
Office Action issued in counterpart European Patent Application No. 17747572.0, dated Dec. 13, 2019 (6 pages).

* cited by examiner

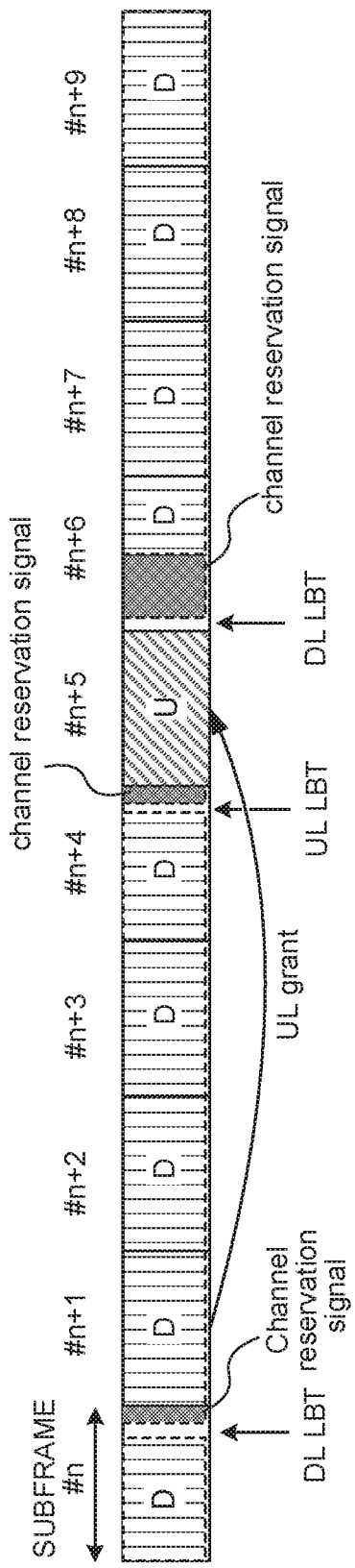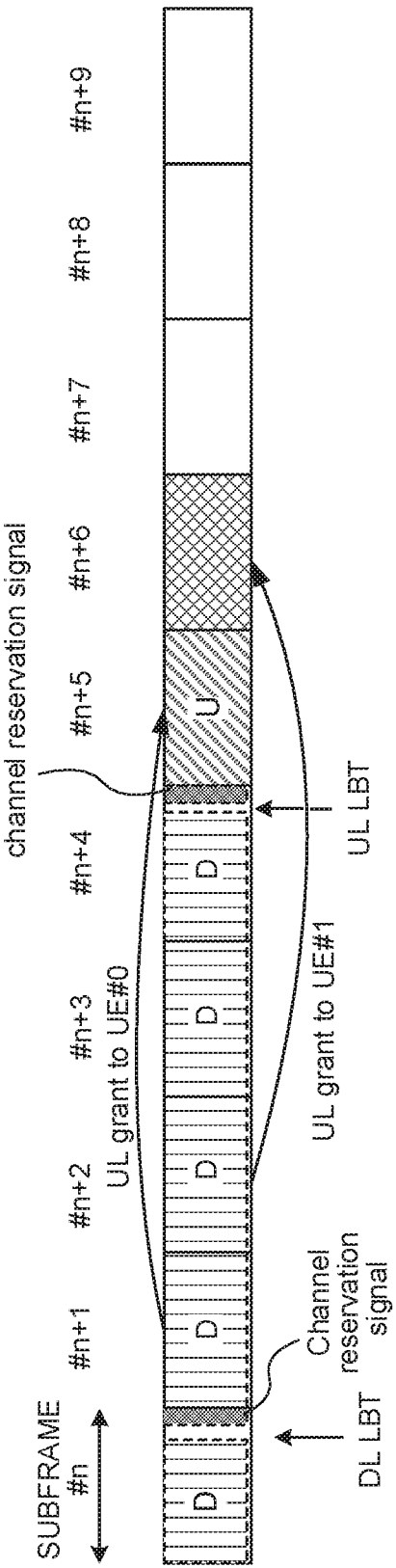

| bit | structure |
|---|---|
| '0' | X symbols |
| '1' | 14 symbols |

FIG. 3A

| bit | structure |
|---|---|
| '00' | 11 symbols |
| '01' | 12 symbols |
| '10' | 13 symbols |
| '11' | 14 symbols |

FIG. 3B

TERMINAL, RADIO BASE STATION, RADIO COMMUNICATION METHOD, AND SYSTEM FOR A PHYSICAL UPLINK SHARED CHANNEL AND SOUNDING REFERENCE SIGNAL

CROSS-REFERENCE TO RELATED APPLICATIONS

This application is a continuation application of U.S. patent application Ser. No. 16/069,579, filed on Jul. 12, 2018, which is a national phase application of PCT/JP2017/004018, filed on Feb. 3, 2017, which claims priority to Japanese Patent Application No. 2016-020217, filed on Feb. 4, 2016. The contents of these applications are hereby incorporated by reference in their entirety.

TECHNICAL FIELD

The present invention relates to a terminal, a radio communication method, and a base station for a next-generation mobile communication system.

BACKGROUND ART

For the universal mobile telecommunications system (UMTS) network, the long-term evolution (LTE) has been specified for further enhanced data rates and lower delay (see Non-Patent Literature 1). The LTE-A (also referred to as LTE advanced, LTE Rel. 10, 11, or 12) has been specified for achieving even wider bands and higher speed than those of LTE (also referred to as LTE Rel.8 or 9), and the succeeding systems (e.g., future radio access (FRA), $5^{th}$ generation mobile communication system (5G), and LTE Rel.13) are under study.

LTE Rel.8 to 12 have been specified assuming exclusive use of frequency bands given to providers (operators) (also referred to as licensed bands). For licensed bands, 800 MHz, 1.7 GHz, 2 GHz or the like is used.

In recent years, the widespread use of smartphones, tablets, or other high-function user terminal (UE) has dramatically increased user traffic. Further additional frequency bands are required to absorb increasing user traffic, although there is a limitation on the number of spectra for licensed bands (licensed spectra).

For this reason, Rel.13 LTE assumes extending the frequency for LTE systems by using bands of unlicensed spectra (unlicensed bands) which are non-exclusive to licensed bands (see Non-Patent Literature 2). Examples of assumed unlicensed bands include 2.4-GHz and 5-GHz bands in which, for example, Wi-Fi (registered trademark) and Bluetooth (registered trademark) can be used.

In particular, LTE Rel.13 assumes carrier aggregation (CA) of licensed bands and unlicensed bands. Communication using licensed bands together with unlicensed bands in this manner is referred to as license-assisted access (LAA). It should be noted that future LAA possibly assumes dual connectivity (DC) of licensed bands and unlicensed bands and stand-alone (SA) of unlicensed bands.

CITATION LIST

Non-Patent Literature

[Non-Patent Literature 1]
3GPP TS 36.300 "Evolved Universal Terrestrial Radio Access (E-UTRA) and Evolved Universal Terrestrial Radio Access Network (E-UTRAN); Overall description; Stage 2"

[Non-Patent Literature 2]
AT&T, "Drivers, Benefits and Challenges for LTE in Unlicensed Spectrum," 3GPP TSG RAN Meeting #62 RP-131701

SUMMARY OF INVENTION

Technical Problem

Communication using an unlicensed band needs to take into consideration other entities that communicate using this unlicensed band (e.g., other user terminal). Accordingly, if a scheme of assigning the uplink resource for the licensed band is applied to an unlicensed band as it is, proper resource assignment in the unlicensed band may not be performed particularly in uplink (UL) transmission.

An object of the present invention, which has been made to solve this problem, is to provide a user terminal, a radio base station, and a radio communication method that provide proper resource assignment in communication using an unlicensed band.

Solution to Problem

A user terminal according to one embodiment includes: a transmitting section that transmits a UL signal; and a control section that controls the transmitting section to transmit a physical uplink shared channel (PUSCH) and a measurement reference signal (sounding reference signal (SRS)) in accordance with different grants included in a DL signal. The control section transmits the physical uplink shared channel following transmission of the measurement reference signal.

Advantageous Effects of Invention

The present invention provides proper resource assignment in communication using an unlicensed band.

BRIEF DESCRIPTION OF DRAWINGS

FIGS. 1A and 1B are diagrams illustrating a radio frame configuration in an unlicensed band.

FIGS. 3A and 3B are diagrams illustrating information (UL subframe configuration information) on a UL configuration according to the second embodiment.

DESCRIPTION OF EMBODIMENTS

Figure 2:
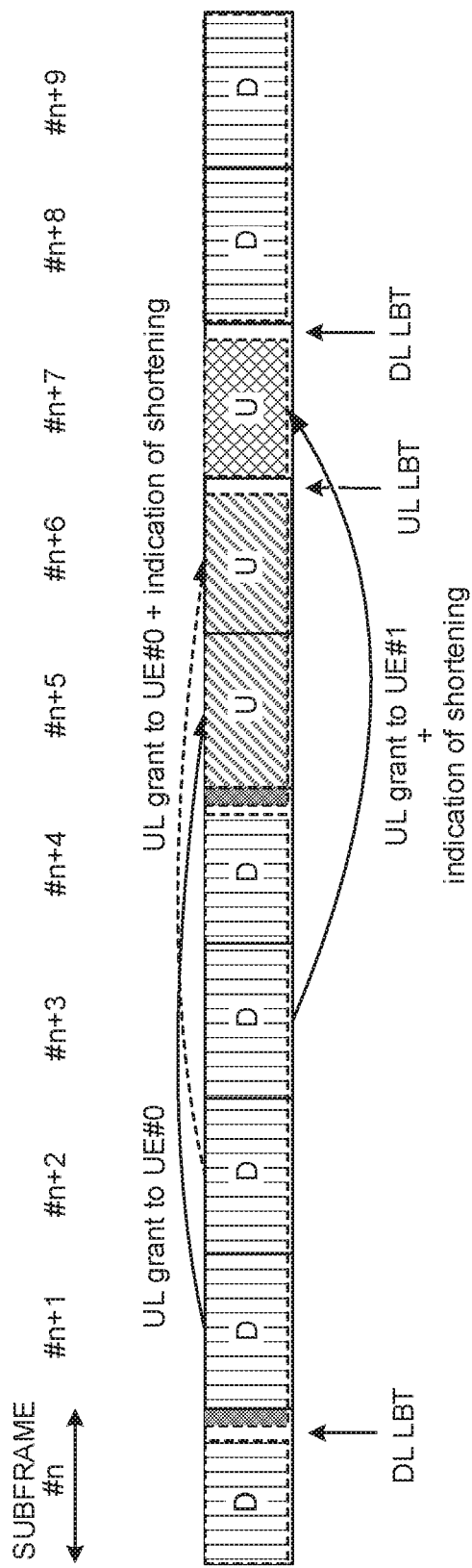
FIG. 2 is a diagram illustrating a radio frame configuration in an unlicensed band according to the first embodiment.

A system for running LTE/LTE-A in an unlicensed band (e.g., LAA system) may require an interference control function for coexistence with LTE, Wi-Fi, or other systems of other providers. It should be noted that systems for running LTE/LTE-A in unlicensed bands may be collectively referred to as LAA, LAA-LTE, LTE-U, or U-LTE, independently of its running method: CA, DC or SA.

In general, a transmission point (e.g., radio base station (eNB) or user terminal (UE)) that communicates using a carrier in an unlicensed band (which can be referred to as carrier frequency or simply frequency) is banned from transmitting through the carrier, upon detection of another entity (e.g., another user terminal) that communicates using a carrier in that unlicensed band.

For this reason, a transmission point performs listening (listen before talk (LBT)) in a timing which is a predetermined period before the transmission timing. To be specific, a transmission point performing LBT searches an entire target carrier band (e.g., one component carrier (CC)) in a timing which is a predetermined period before the transmission timing and determines if another device (e.g., a radio base station, user terminal, or a Wi-Fi device) is communicating in that carrier band.

In this description, listening is to detect/measure whether, before one transmission point (e.g., a radio base station or user terminal) transmits a signal, another transmission point transmits a signal exceeding a predetermined level (e.g., predetermined power). Listening performed by a radio base station and/or user terminal may be referred to as LBT, clear channel assessment (CCA), or carrier sense.

If the fact that no other device is performing communication is confirmed, the transmission point transmits using that carrier. For example, if reception power measured by LBT (reception signal power during LBT) is below a predetermined threshold, the transmission point determines that the channel is in the idle state ($LBT_{idle}$) and conducts transmission. The fact that "a channel is in the idle state" means that the channel is occupied by a particular system, the channel is idle, the channel is clear, or the channel is free.

Meanwhile, upon detection of the fact that another device is partly using the target carrier band, the transmission point stops its transmission processing. For example, upon detection of the fact that the reception power of a signal from the other device associated to this band exceeds a predetermined threshold, the transmission point determines that the channel is in the busy state ($LBT_{busy}$) and does not perform transmission. In the case of $LBT_{busy}$, the channel becomes available once its idle state is confirmed in the next LBT. It should be noted that the method of determining the idle state/busy state of the channel by using LBT is not limited to this.

Frame based equipment (FBE) and load based equipment (LBE) are assumed as LBT mechanisms (schemes). They differ in frame configuration for transmission and reception, and channel occupation time. FBE, which is also referred to as category 2, has fixed timings for an LBT-based transmission/reception configuration. LBE, which is also referred to as category 4, features an LBT-based transmission/reception configuration which is unfixed along the time axis and performs LBT depending on the demand. It should be noted that transmission independent of LBT is also referred to as category 1.

To be specific, FBE, which features fixed frame cycles, is a mechanism that performs transmission if the channel is available after a predetermined time of carrier sense in a predetermined frame (which may also be referred to as LBT time (LBT duration)) and stays in the standby mode until the carrier sense timing in the next frame if the channel is unavailable.

Meanwhile, LBE is a mechanism that follows the extended CCA (ECCA) procedure that extends carrier sense time if the channel is unavailable after carrier sense (initial CCA), and continues carrier sense until the channel becomes available. LBE requires random back-off for properly avoiding collision.

It should be noted that carrier sense time (which may also be referred to as a carrier sense period) is the time (e.g., one symbol length) when listening or other processing is carried out to determine if the channel is available so that one LBT result can be obtained.

A transmission point can transmit a predetermined signal (e.g., a channel reservation signal) depending on the LBT result. Here, the LBT result refers to information (e.g., $LBT_{idle}$ or $LBT_{busy}$) that is obtained by LBT and indicates the availability of the channel in the carrier to which LBT is allocated.

If the transmission point starts transmission while the LBT result is the idle state ($LBT_{idle}$), the transmission can be performed skipping LBT for a predetermined period (e.g., 10 to 13 ms). This type of transmission is referred to as burst transmission, burst, transmission burst, and the like.

As described above, in the LAA system, the transmission point is provided with interference control in the same frequency based on the LBT mechanism, thereby avoiding an interference between LAA and Wi-Fi and between LAA systems. Even in the case where each transmission point is controlled independently by the corresponding operator running the LAA system, LBT allows control operations to be independent of one another, thereby reducing interferences.

In the LAA system, user terminal performs radio resource management (RRM) measurement (including reference signal received power (RSRP) measurement) for detecting cells (secondary cells (SCells)) in an unlicensed band. Discovery reference signals (DRSs) are assumed for use in the RRM measurement.

A DRS used in the LAA system may include at least one of a synchronization signal (primary synchronization signal (PSS)/secondary synchronization signal (SSS)), a cell-specific reference signal (CRS), and a channel state information reference signal (CSI-RS). The DRS is transmitted during a DMTC period (DMTC duration) in a predetermined cycle (also referred to as discovery measurement timing configuration periodicity (DMTC cycle)). It should be noted that the DRS may be referred to as a detection signal, a detection measurement signal, a discovery signal (DS), an LAA DRS, or an LAA DS.

In the LAA system, user terminal performs CSI measurement using a CRS and/or a CSI-RS (hereinafter referred to as a CRS/CSI-RS) transmitted through a cell in an unlicensed band, and sends the measurement result to the radio base station (CSI reporting). It should be noted that the CRS may be included in each downlink subframe or a CRS forming a DRS. The CSI-RS is a CSI-RS transmitted in a predetermined cycle (e.g., 5 ms or 10 ms) and is allocated in addition to a CSI-RS forming a DRS.

In the LAA system, it is also assumed that, upon the success of LBT (in the idle state), the minimum transmission band width used by the transmission point is limited to a predetermined bandwidth (e.g., 5 MHz or 4 MHz) or above.

By the way, enhanced LAA (eLAA) according to Rel.14 assumes various specifications for achieving UL CA. For example, it is assumed that a measurement reference signal (sounding reference signal (SRS)) is specified as a physical uplink shared channel (PUSCH) or an uplink reference signal. It is also assumed that the specification of an uplink L1/L2 control channel (physical uplink control channel (PUCCH)) or a physical random access channel (PRACH) is changed as needed.

Meanwhile, in DL LAA according to Rel.13, LBT can be performed anytime but DL transmission should be started and ended at limited times. The subframe boundaries for a LAA Scell and a Pcell are aligned with each other. The times when control/data/reference signals start in one subframe (14 symbols) are limited to the first and eighth symbol (symbols #0 and #7). The times when the transmission ends are limited to the third, sixth, ninth, 10th, 11th, 12th, and 14th symbols (symbols #2, #5, #8, #9, #10, #11, and #13). In addition, in DL LAA according to Rel.13, subframe-by-subframe processing for LTE is continued.

As described above, the times when transmission is started and ended are limited to simplify a radio base station and user terminal. If these limited timings are applied to eLAA, there is a risk that a UL transmission start timing (hereinafter referred to as a "transmission timing") is limited to a subframe boundary or slot boundary. It should be noted that "a transmission timing" is not a time when a signal is actually output but a time when a control signal, a data signal, a reference signal, or other meaningful signals is transmitted.

In LTE, since UL transmission time interval (TTI) is set to 1 ms, it is assumed that resource assignment is not efficiently performed due to LBT which can be executed anytime. For example, with limited transmission timings, it is assumed that the next subframe is used for DL or UL upon the success of LBT. Here, if an LBT end time is before a boundary (a subframe boundary or slot boundary), regardless of the success of LBT, UL transmission or DL transmission cannot be started immediately, which may hinder efficient resource assignment.

Possible cases will be given below.

In LTE, UL transmission is performed using the symbols in the fourth subframe after the reception of a subframe including a UL grant. Upon reception of a UL grant, user terminal performs LBT before the subframe designated by the UL grant and, upon the success of LBT, performs UL transmission through the designated subframe. It should be noted that the UL grant may be transmitted through a licensed carrier or an unlicensed carrier.

For example, as illustrated in FIG. 1A, upon the transmission of an UL grant to user terminal through a subframe #n+1, the user terminal receiving it performs LBT (UL LBT) before the subframe #n+5 which is the fourth subframe from the subframe #n+1 that involves the transmission of the UL grant. Upon the success of LBT (if the channel is in the idle state), the user terminal performs UL transmission using the subframe #n+5. In the case where this subframe-by-subframe processing is carried out for UL transmission, as illustrated in FIG. 1A, a signal for UL transmission is assigned to all the symbols in the subframe #n+5.

Meanwhile, the subframe following the subframe used for UL transmission by the user terminal is assumed to be used for DL transmission from a radio base station. At this time, the radio base station needs to conduct LBT (DL LBT). However, since the UL transmission signal is assigned to all the symbols in the subframe #n+5 as illustrated in FIG. 1A, LBT is performed from the top of the subframe #n+6.

At the success of LBT, the LBT end time is possibly before a boundary of the subframe #n+6 or its slot. Accordingly, the radio base station needs to keep outputting a channel reservation signal for keeping the channel available until it reaches any of these boundaries. If the channel reservation signal keeps the channel available and it reaches a boundary of a slot of the subframe #n+6, the radio base station performs DL transmission by using a symbol after the last slot of the subframe #n+6.

The subframe following the subframe used for UL transmission by the user terminal is assumed to be used for UL transmission from another piece of user terminal. FIG. 1B illustrates the case where the other piece of user terminal UE #1 performs UL transmission through the subframe #n+6 in accordance with the UL grant in the subframe #n+2. However, even if the user terminal UE #1 performs LBT before the subframe #n+6, the channel is determined to be in the busy state because the user terminal UE #0 performs UL transmission in the subframe #n+5; thus, UL transmission is impossible in the subframe #n+6.

Accordingly, the present inventors have arrived at this present invention, focusing on the fact that the efficiency of resource assignment is improved by a proper UL subframe configuration (UL configuration) in an unlicensed band. For example, they have found that, during UL transmission in an unlicensed band, controlling the number of symbols to which a resource can be assigned improves the use efficiency of frequency in the unlicensed band.

One embodiment of the present invention will now be described in detail referring to the drawings. Although this embodiment describes a carrier (a cell) involving listening as an unlicensed band, this is not necessarily the case. This embodiment is applicable to both licensed bands and unlicensed bands as long as they correspond to frequency carriers (cells) involving listening.

(Radio Communication Method)

A radio communication method according to this embodiment supports two UL subframe configurations: (a) full-subframe transmission in which all the symbols in a subframe (e.g., in the case of an LTE subframe, 14 symbols in it) are used for UL signal assignment and (b) partial subframe (partial subframe) transmission in which at least one but not all of the symbols in a subframe is used for UL signal assignment (at least one symbol is not transmitted). This full-subframe transmission can be used for UL transmission using a sequence of subframes (burst transmission). Partial subframe transmission is used for DL transmission from a radio base station through the following subframe or UL transmission from another piece of user terminal.

Embodiments of the radio communication method will now be explained.

First Embodiment

In the first embodiment, partial subframe transmission is automatically applied to the last subframe for UL transmission. To be specific, user terminal automatically applies partial subframe transmission to the last subframe for UL transmission, and assigns a UL signal to the symbols in this subframe. In UL transmission using burst transmission, the last subframe uses partial subframe transmission and the other subframes use full-subframe transmission. For example, when a single subframe is designated by a UL grant, user terminal applies partial subframe transmission to the designated subframe.

For example, as illustrated in FIG. 2, suppose that upon DL transmission from a radio base station, the UL grants for the subframes #n+1 and #n+2 designate UL transmission for the user terminal UE #0. To be specific, the UL grant for the subframe #n+1 designates the subframe #n+5 which comes after four subframes. The UL grant for the subframe #n+2 designates the subframe #n+6 which comes after four subframes.

The user terminal UE #0 performs burst transmission as UL transmission, full-subframe transmission is used for the UL subframe of the subframe #n+5, so that UL signals are assigned to all the symbols. Meanwhile, partial subframe transmission is used for the subframe #n+6, which is the last subframe for burst transmission, so that UL signals are assigned to at least one but not all of the symbols in the subframe (at least one symbol in the subframe is not transmitted).

In UL signal assignment with partial subframe transmission, the last symbol (the latest symbol along the time axis) or a predetermined number of the last symbols (a predetermined number of the latest symbols along the time axis) in the UL subframe are punctured, and UL signals are assigned to the rest of the symbols. Since the last one or more symbols in the UL subframe are punctured, a gap in which no UL signals are transmitted through the subframe is generated.

Referring to FIG. 2, a gap formed in the subframe #n+6 is used to perform LBT so that the next subframe #n+7 can be used. In the drawing, the subframe #n+3 includes a UL grant for the user terminal #1 and this UL grant designates the subframe #n+7. The user terminal #UE1, which performs UL transmission in the subframe #n+7, can perform LBT in the gap formed in the subframe #n+6.

Upon the success of LBT, as illustrated in FIG. 2, the user terminal UE #1 performs UL transmission through the subframe #n+7.

In addition, partial subframe transmission is used for the user terminal UE #1 because the UL transmission through the subframe #n+7 is not burst transmission. Therefore, a gap is also formed in the subframe #n+7 as in the subframe #n+6. In the example illustrated in FIG. 2, DL transmission is performed by the radio base station through the subframe #n+8 or later. Consequently, the radio base station can perform DL LBT in the gap formed in the subframe #n+7.

As described above, the first embodiment does not need to continuously output such a long channel reservation signal that occurs in the case illustrated in FIG. 1A. Further, it can prevent the failure of UL transmission performed by the user terminal UE #1 through a subframe designated by a UL grant, due to the busy state of the channel as illustrated in the case in FIG. 1B.

In this manner, the first embodiment employs a proper UL subframe configuration (UL configuration) in an unlicensed band, improving the efficiency of resource assignment. This leads to an improvement in the use efficiency of frequency in the unlicensed band.

For burst transmission, when partial subframe transmission is only used for the last subframe and full-subframe transmission is used for the other subframes, a gap formation is prevented in the subframes other than the last subframe. If a gap is formed in any of the subframes other than the last subframe, this gap may be used by the other user terminal for its LBT and UL transmission for this user terminal may be an interrupt.

In this first embodiment, the number of symbols for partial subframe transmission applied to the last subframe may be controlled by control information transmitted from a radio base station. For example, control information contained in downlink control information (DCI) may be used to designate the number of symbols or update UL subframe configuration information (information on the UL configuration) which is preliminarily loaded to user terminal. Such control information transmission may use a notification scheme according to the second embodiment described below.

Second Embodiment

In the second embodiment, notification of the configuration of each subframe in UL transmission is dynamically performed. To be specific, the radio base station dynamically instructs which transmission scheme, full-subframe transmission or partial subframe transmission, is used, through UL subframe configuration information (information on the UL configuration) for every subframe for UL transmission. UL subframe configuration information may consist of, for example, 1-bit information illustrated in FIG. 3A or 2-bit information illustrated in FIG. 3B.

UL subframe configuration information illustrated in FIG. 3A is 1-bit information. Bit "0" represents X symbols (X is less than 14), and bit "1" represents 14 symbols. Such UL subframe configuration information can designate whether each subframe configuration consists of X symbols or 14 symbols. In particular, for a subframe designated by bit "0" can use partial subframe transmission with X symbols, and a subframe designated by bit "1" can use full-subframe transmission with 14 symbols.

UL subframe configuration information in FIG. 3B is 2-bit information. "00" represents 11 symbols, "01" represents 12 symbols, "10" represents 13 symbols, and "11" represents 14 symbols. Such UL subframe configuration information can designate which of the following: full-subframe transmission and partial subframe transmission each subframe uses. Further, in partial subframe transmission, it is possible to designate with which of the following number of symbols: 11, 12, and 13, assignment for UL signals is performed.

Controlling the number of symbols for partial subframe transmission enables control of the gap length for LBT (listening). For example, partial subframe transmission using 11 symbols ensures a gap length of three symbols. Similarly, 12 symbols ensure a gap length of two symbols, and 13 symbols ensure a gap length of one symbol. The time that a transmit base station using the next subframe requires for listening for keeping a channel varies depending on the values of random back-off and contention window size that the transmit base station uses for LBT. Therefore, with UL subframe configuration information in FIG. 3B, in a radio base station, the gap length required for listening can be indicated according to the LBT parameters applied to the radio station or user terminal connected thereto, thereby avoiding long-time output of a channel reservation signal that continues until a subframe boundary or slot boundary.

This 1-bit or 2-bit UL subframe configuration information may be notified from a radio base station to user terminal through UL scheduling DCI. In this case, an existing DCI format 0/4 may be used. Alternatively, a new DCI format (new extended DCI format) for LAA UL scheduling may be defined for used.

Alternatively, UL subframe configuration information may be notified through common signaling, e.g., a common DCI in the same subframe as scheduling DCI. When user terminal fails to detect the common DCI, a UL subframe with a predetermined number of symbols (a default number of symbols) may be used. For example, any of the bit numbers (two bits) illustrated in FIG. 3B is defined as a default value and resource assignment for a UL subframe may be performed based on the number of symbols designated by this bit number.

Alternatively, UL subframe configuration information may be notified through higher-layer signaling, for example, RRC signaling. Further, with higher-layer signaling, the number of symbols (X symbols) designated by bit "0" in FIG. 3A may be updated. For example, with higher-layer signaling, the value X may be designated.

In this manner, like the first embodiment, the second embodiment employs a proper UL subframe configuration (UL configuration) in an unlicensed band, improving the efficiency of resource assignment (FIG. 2). This leads to an improvement in the use efficiency of frequency in the unlicensed band. In the second embodiment, in particular, the configuration of each subframe for UL transmission is dynamically notified to user terminal, thereby providing a proper UL subframe configuration that varies dependent on the causes of variations in the time required for listening, such as the values of random back-off and contention window size that the transmit base station uses for LBT.

Third Embodiment

The third embodiment relates to transmission of measurement reference signals (sounding reference signals (SRSs)) serving as uplink reference signals. In partial subframe transmission used in the first and second embodiments, the last one or more symbols out of the 14 symbols in a UL subframe are punctured. In this case, symbols to which an SRS is assigned may be removed, which may decrease the opportunity of transmitting SRSs. To solve this problem, the third embodiment provides a technique for ensuring the opportunity of transmitting SRSs even if partial subframe transmission is used.

Figure 4A:
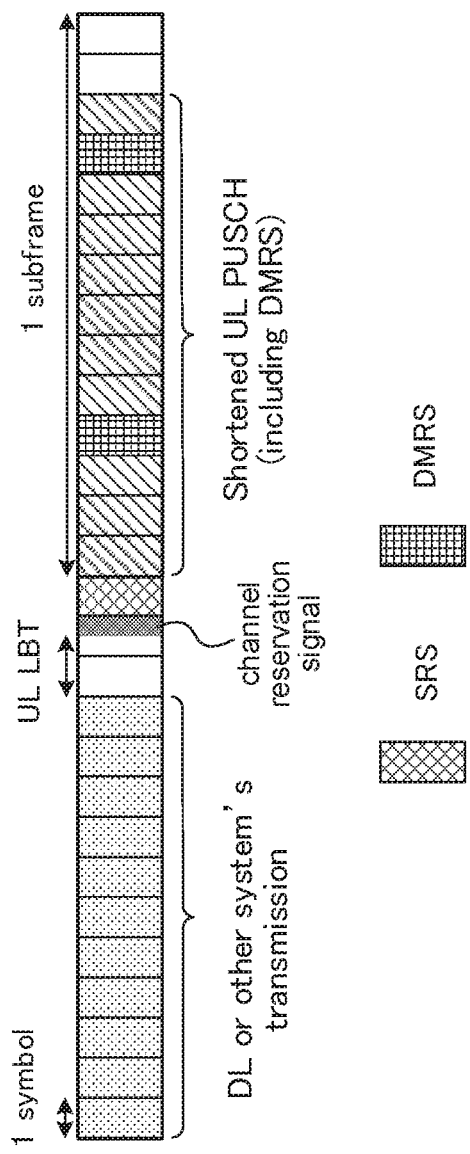
FIGS. 4A and 4B are diagrams for explaining a UL configuration according to the third embodiment.

To be specific, when UL transmission is scheduled and partial subframe transmission is used, an SRS is transmitted through a symbol just before a subframe for transmitting a PUSCH. As illustrated in FIG. 4A, an SRS is assigned to the symbol just before the subframe (shortened UL PUSCH) for partial subframe transmission.

This type of SRS transmission may be based on either SRS generation in an uplink pilot timeslot (UpPTS) or SRS generation in a normal subframe.

Figure 4B:
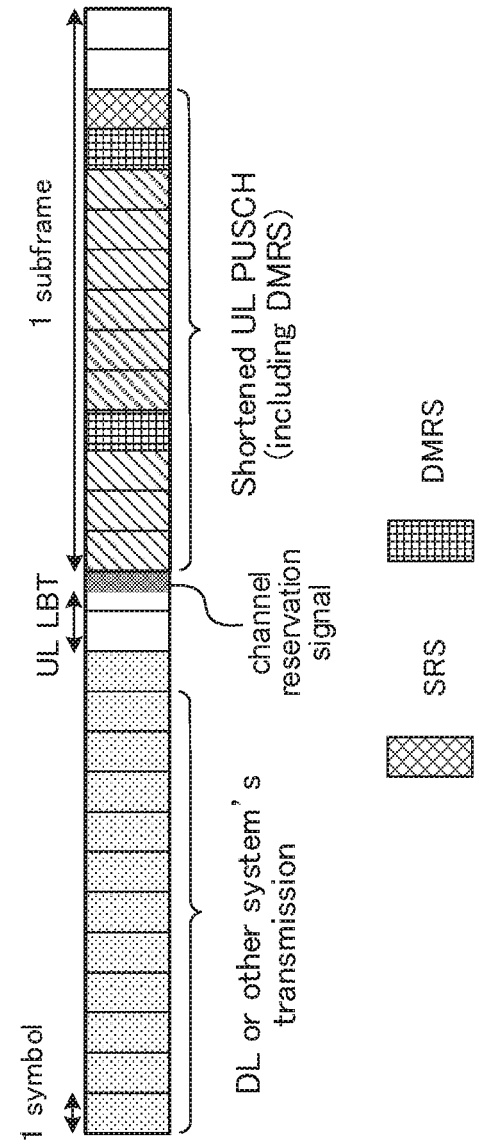

Transmission of an SRS, serving as an aperiodic SRS, is triggered by DCI. For this reason, when UL LBT is succeeded and the symbol just before the subframe for transmitting a PUSCH is available, an SRS is transmitted through this symbol (FIG. 4A). Alternatively, as illustrated in FIG. 4B, the SRS may be transmitted through the last symbol of the subframe for transmitting the PUSCH. This type of SRS transmission can be used, for example, when the symbol just before the subframe for transmitting the PUSCH is not available.

When SRS transmission is triggered, user terminal may determine which of the methods of transmitting an SRS illustrated in FIGS. 4A and 4B is used. As illustrated in FIGS. 4A and 4B, the positions of the symbols to which a demodulation reference signal (DMRS) is assigned are fixed.

As described above, the third embodiment provides a technique for ensuring the opportunity of transmitting SRSs even if partial subframe transmission is used.

Fourth Embodiment

A radio communication method according to this embodiment defines, as a new parameter, the number of symbols that can be used for a UL subframe. For this reason, the transport block size (TBS), which is generally determined by an instruction given by a modulation and coding scheme (MCS), is preferably taken into consideration. For example, UL transport block assignment in an LAA Scell is preferably made taking into consideration not only a 5-bit MCS field but also the number of symbols in the available subframe.

To be specific, PUSCH transport block assignment (TBS) for a LAA Scell is made according to the MCS field, PRB number, and the number of symbols that can be assigned in PUSCH UL transmission. It should be noted that the number of symbols that can be assigned in PUSCH UL transmission depends on not only the presence or absence of SRS transmission but also UL subframe configuration information sent from a radio base station.

As described above, the fourth embodiment can provide proper TBS, thereby improving the use efficiency of frequency in an unlicensed band.

As described above, the radio communication method according to this embodiment controls (performs appropriate setting of) the UL subframe configuration (UL configuration) in an unlicensed band, improving the efficiency of resource assignment. Particularly the number of symbols available for resource assignment is controlled, leading to an improvement in the use efficiency of frequency in the unlicensed band.

(Radio Communication System)

The configuration of a radio communication system according to this embodiment will now be described. This radio communication system employs a radio communication method according to each of the aforementioned embodiments. It should be noted that the radio communication methods according to the embodiments may be used alone or in combination.

Figure 5:
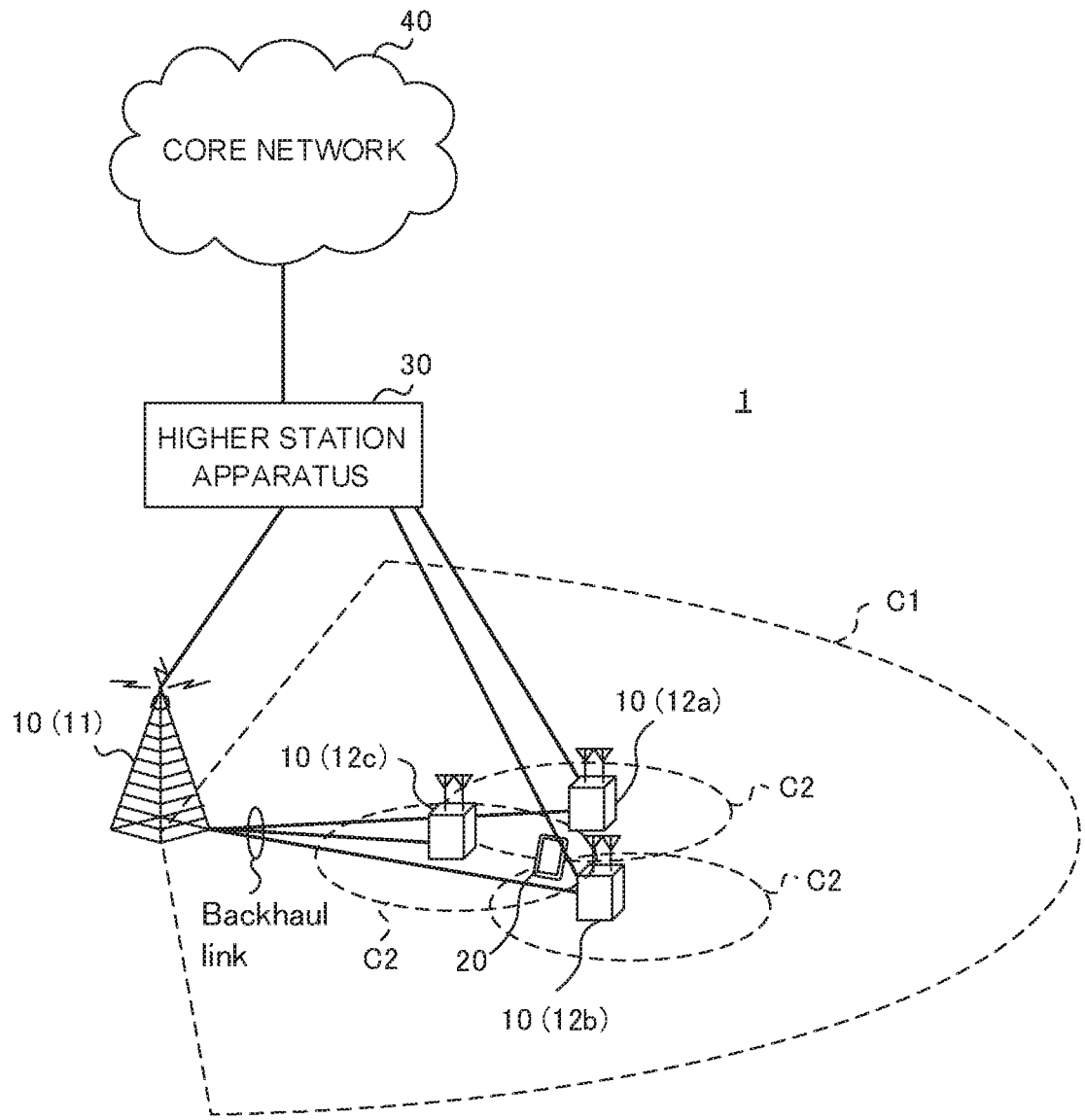
FIG. 5 is a diagram illustrating an example schematic configuration of a radio communication system according to this embodiment.

FIG. 5 is a diagram illustrating an example schematic configuration of a radio communication system according to this embodiment. A radio communication system 1 can employ carrier aggregation (CA) and/or dual connectivity (DC) that unites a plurality of basic frequency blocks (component carriers) using a system band width for an LTE system as one section. Moreover, this radio communication system 1 includes radio base stations that can use unlicensed bands ((e.g., LTE-U base stations).

It should be noted that the radio communication system 1 may also be referred to as SUPER 3G, LTE-Advanced (LTE-A), IMT-Advanced, 4th generation mobile communication system (4G), 5th generation mobile communication system (5G), or future radio access (FRA).

The radio communication system 1 in FIG. 5 includes a radio base station 11 that forms a macro cell C1, and radio base stations 12 (12a to 12c) that form small cells C2 which are present inside the macro cell C1 and smaller than the macro cell C1. User terminal 20 exists in the macro cell C1 and the small cells C2. For example, the macro cells C1 may be used in licensed bands, and the small cells C2 may be used in unlicensed bands (LTE-U). Further, at least one but not all of the small cells may be used in licensed bands, and the other small cells may be used in unlicensed bands.

The user terminal 20 can be connected to both the radio base station 11 and the radio base stations 12. The user terminal 20 is assumed to use the macro cell C1 and the small cells C2, which use different frequencies, at the same time with CA or DC. For example, the radio base station 11 using a licensed band can transmit assistance information (e.g., downlink signal configuration) on the radio base stations 12 (e.g., LTE-U base stations) using an unlicensed band, to the user terminal 20. To achieve CA between a licensed band and an unlicensed band, one radio base station (e.g., the radio base station 11) may control the schedules of licensed band cells and unlicensed band cells.

The user terminal 20 may be connected not to the radio base station 11 but to the radio base stations 12. For example, the radio base stations 12 using an unlicensed band may be connected to the user terminal 20 in a standalone manner. In this case, the radio base stations 12 control the schedules of the unlicensed band cells.

Communication between the user terminal 20 and the radio base station 11 may use a carrier supporting a narrow bandwidth (referred to as an existing carrier or legacy carrier), in a relatively low frequency band (e.g., 2 GHz). Meanwhile, communication between the user terminal 20 and each radio base station 12 may use a carrier supporting a wide bandwidth or the same carrier as that between the user terminal 20 and the radio base station 11, in a relatively high frequency band (e.g., 3.5 GHz or 5 GHz). It should be noted that the frequency band used by each radio base station is not limited to this.

The radio base station 11 and each radio base station 12 (or two radio base stations 12) may be wired to each other (e.g., through an optical fiber or X2 interface according to the common public radio interface (CPRI)) or connected wirelessly to each other.

The radio base station 11 and the radio base stations 12 are connected to a higher station apparatus 30 and to a core network 40 via the higher station apparatus 30. Examples of the higher station apparatus 30 include, but should not be limited to, access gateway devices, radio network controllers (RNCs), and mobility management entities (MMEs). Each radio base station 12 may be connected to the higher station apparatus 30 via the radio base station 11.

It should be noted that the radio base station 11 is a radio base station with a relatively wide coverage and may be referred to as a macro base station, an aggregate node, an eNodeB (eNB), or a transmit/receive point. It should be noted that the radio base station 12 is a radio base station with local coverage and may be referred to as a small base station, a micro base station, a pico base station, a femto base station, a home eNodeB (HeNB), a remote radio head (RRH), or a transmit/receive point. When the radio base stations 11 and 12 are not distinguished from each other, they are collectively referred to as a radio base station 10. Radio base stations 10 sharing the same unlicensed band are preferably in synchronization with each other along the time axis.

Each user terminal 20 supports LTE, LTE-A, and other communication systems and may be a mobile communication terminal or a land-line communication terminal.

The radio communication system 1 uses orthogonal frequency division multiple access (OFDMA) for downlink and single-carrier frequency division multiple access (SC-FDMA) for uplink as radio access schemes. OFDMA is a multi-carrier transfer system in which a frequency band is divided into a plurality of narrow frequency bands (sub-carriers) and data is mapped to each sub-carrier for communication. SC-FDMA is a single-carrier transfer system in which the system band width is divided into bands each consisting of one or a sequence of resource blocks for each equipment piece and a plurality of equipment pieces use different bands, thereby reducing an interference between the equipment pieces. It should be noted that the combination of uplink and downlink radio access systems is not necessarily like this.

In the radio communication system 1, the downlink channels are physical downlink shared channels (PDSCHs) shared among the user terminal 20, physical broadcast channels (PBCHs), and downlink L1/L2 control channels, for example. A PDSCH may also be referred to as a downlink data channel. User data, higher layer control information, system information blocks (SIBs), and the like are transmitted through PDSCHs. Master information blocks (MIBs) are transmitted through PBCHs.

Downlink L1/L2 control channels include physical downlink control channels (PDCCHs), enhanced physical downlink control channels (EPDCCHs), physical control format indicator channels (PCFICHs), and physical hybrid-ARQ indicator channels (PHICHs). Downlink control information (DCI) including PDSCH and PUSCH scheduling information is transmitted through PDCCHs. Control format indicator (CFI) indicating an OFDM symbol number used for a PDCCH is transmitted through a PCFICH. Arrival confirmation information (ACK/NACK) related to HARQ for a PUSCH is transmitted through a PHICH. Like a PDCCH, an EPDCCH is subjected to frequency division multiplexing with a PDSCH and used for DCI transmission.

In the radio communication system 1, the uplink channels are physical uplink shared channels (PUSCHs) shared among the user terminal 20, and uplink L1/L2 control channels (physical uplink control channels (PUCCHs)), and physical random access channels (PRACHs), for example. A PUSCH may be referred to as an uplink data channel. User data and upper layer control information are transmitted through PUSCHs.

In addition, downlink radio quality information (channel quality indicator (CQI)) and arrival confirmation information (ACK/NACK) are transmitted through a PUCCH. A random access preamble for establishing connection with a cell is transmitted through a PRACH.

Downlink reference signals in the radio communication system 1 include cell-specific reference signals (CRSs), channel state information-reference signals (CSI-RSs), demodulation reference signals (DMRS), and detection and/or measurement reference signals (discovery reference signals (DRSs)). Uplink reference signals in the radio communication system 1 include measurement reference signals (sounding reference signals (SRSs)) and demodulation reference signals (DMRSs). It should be noted that a DMRS may be referred to as a user terminal-specific reference signal (a UE-specific reference signal). These are not all the transmitted reference signals.

<Radio Base Station>

Figure 6:
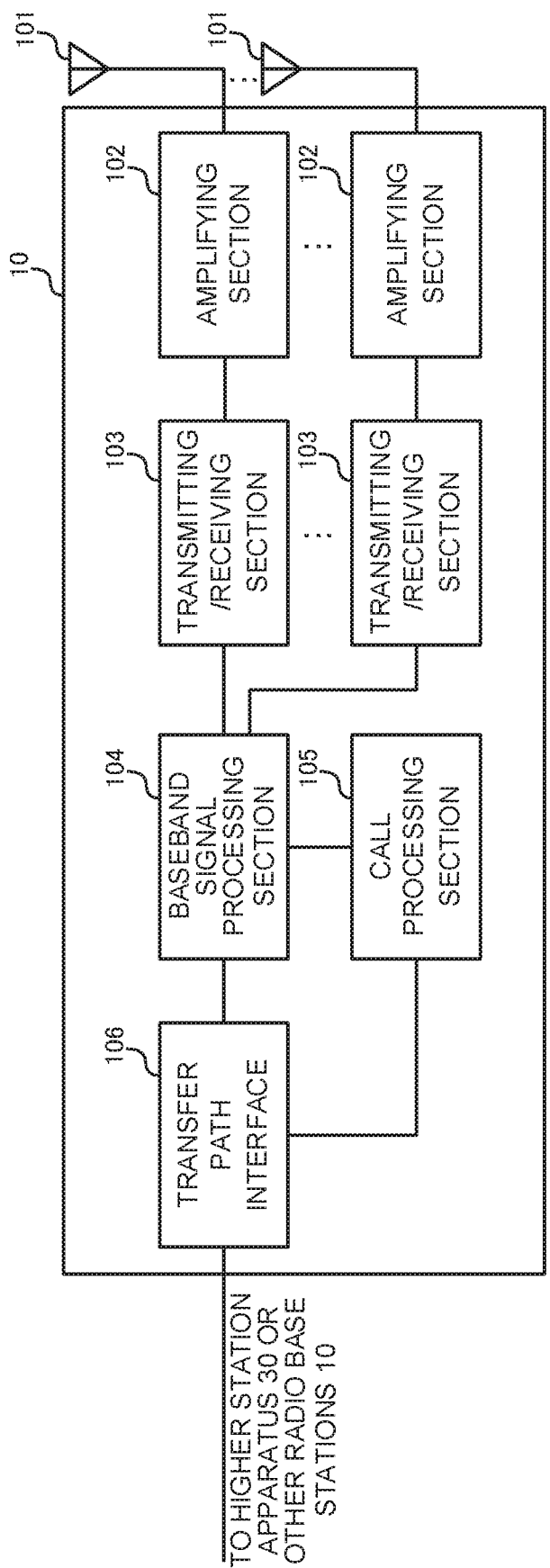
FIG. 6 is a diagram illustrating an example overall configuration of a radio base station according to this embodiment.

FIG. 6 is a diagram illustrating an example overall configuration of a radio base station according to this embodiment. The radio base station 10 includes a plurality of transmitting/receiving antennas 101, amplifying sections 102, transmitting/receiving sections 103, a baseband signal processing section 104, a call processing section 105, and a transfer path interface 106. It should be noted that it includes one or more transmitting/receiving antennas 101, one or more amplifying sections 102, and one or more transmitting/receiving sections 103.

User data transmitted from the radio base station 10 to the user terminal 20 through a downlink channel is fed from the higher station apparatus 30 to the base band signal processing section 104 through the transfer path interface 106.

The base band signal processing section 104 subjects user data to packet data convergence protocol (PDCP) layer processing, user data division/combination, transmission processing for an RLC layer, such as transmission processing for radio link control (RLC) retransmission control, medium access control (MAC) retransmission control (e.g., hybrid automatic repeat request (HARQ) transmission processing), scheduling, transmission format selection, channel coding, inverse fast Fourier transform (IFFT) processing, and pre-coding processing or other transmission processing, and transmits it to each transmitting/receiving section 103. Downlink control signals are subjected to transmission processing, such as channel coding and inverse fast Fourier transform, and then are transferred to each transmitting/receiving section 103.

Each transmitting/receiving section 103 inverts downlink signals, which are pre-coded for each antenna and output from the base band signal processing section 104, to the radio frequency band. Radio-frequency signals which are frequency-inverted in the transmitting/receiving section 103 are amplified by the amplifying section 102 and then transmitted from the transmitting/receiving antenna 101.

The transmitting/receiving section 103 can transmit and receive uplink and/or downlink (hereinafter referred to as uplink/downlink) signals in an unlicensed band. It should be noted that the transmitting/receiving section 103 may be able to transmit and receive uplink/downlink signals in a licensed band. Each transmitting/receiving section 103 is a transmitter/receiver, transmitting/receiving circuit, or a transmitting/receiving device based on common understanding within the technical field of the present invention. It should be noted that the transmitting/receiving section 103 may be a combination transmitting/receiving section or consist of a transmitting section and a receiving section.

As for uplink signals, radio-frequency signals received at the transmitting/receiving antenna 101 are amplified in the amplifying section 102. The transmitting/receiving section 103 receives uplink signals amplified in the amplifying section 102. The transmitting/receiving section 103 frequency-inverts the received signals to baseband signals and feed them to the baseband signal processing section 104.

In the base band signal processing section 104, user data in the received uplink signals is subjected to fast Fourier transform (FFT) processing, inverse discrete Fourier transform (IDFT) processing, error correction decoding, reception processing for MAC retransmission control, and reception processing for RLC layers and PDCP layers, and then transferred to the higher station apparatus 30 through the transfer path interface 106. The call processing section 105 performs call processing, such as communication channel allocation and release, management of the radio base station 10, and management of the radio resource.

The transfer path interface 106 transmits/receives signals to/from the higher station apparatus 30 via a predetermined interface. The transfer path interface 106 may transmit/receive signals to/from another radio base station 10 through a base station to base station interface (e.g., an optical fiber or X2 interface according to a common public radio interface (CPRI)) (backhaul signaling).

It should be noted that the transmitting/receiving section 103 transmits downlink signals to user terminal 20 through at least an unlicensed band. For example, the transmitting/receiving section 103 transmits DCI (an UL grant) for assigning a PUSCH to user terminal 20, and DCI (DL assignment) for assigning a PDSCH to user terminal 20.

It should be noted that the transmitting/receiving section 103 receives uplink signals to user terminal 20 through at least an unlicensed band. For example, the transmitting/receiving section 103 receives the DCI (the UL grant) for assigning a PUSCH from user terminal 20. In addition, the transmitting/receiving section 103 may receive the results of RRM measurement and/or CSI measurement (e.g., A-CSI) from user terminal 20 in a licensed band and/or unlicensed band.

Figure 7:
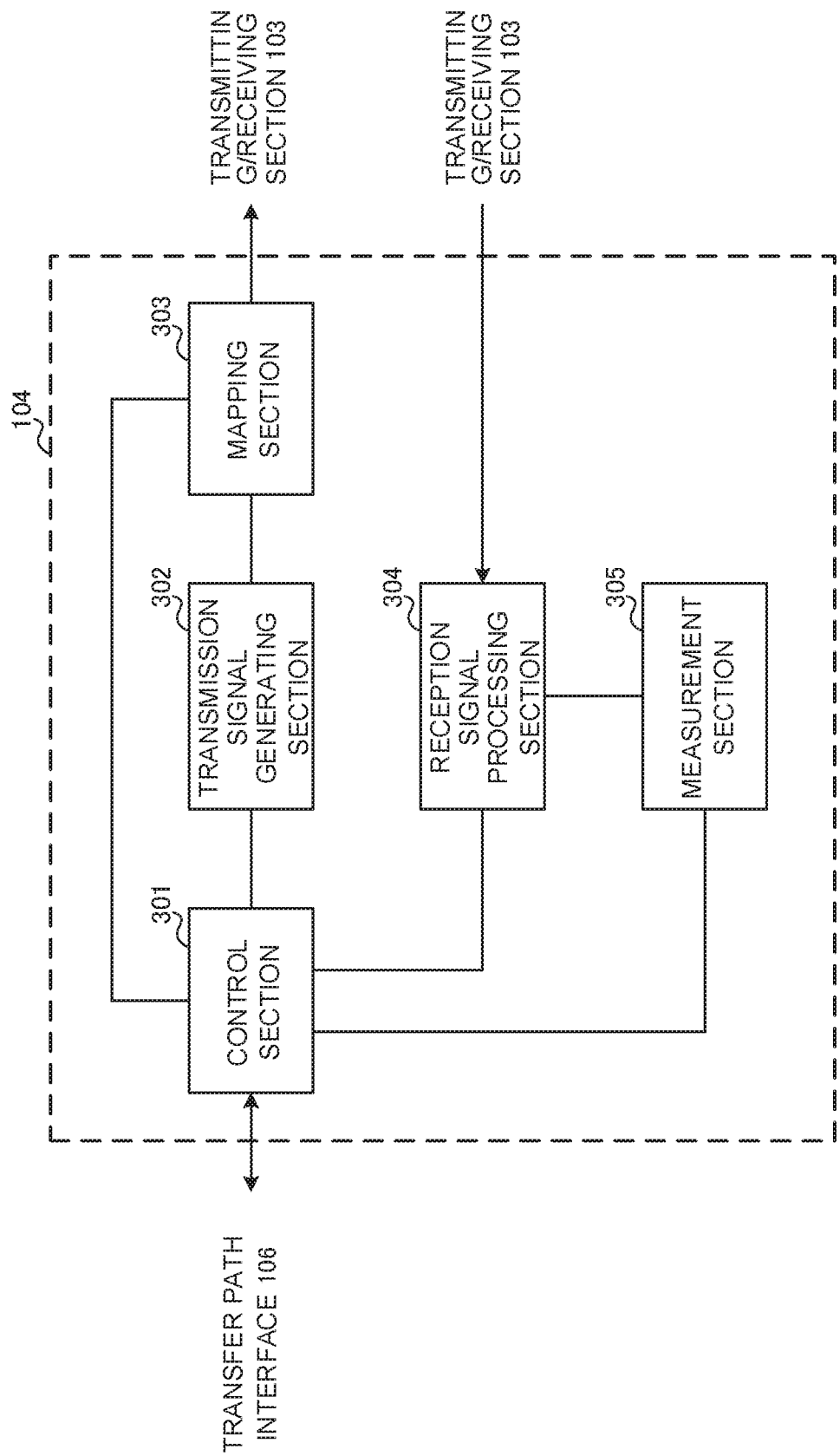
FIG. 7 is a diagram illustrating an example functional structure of a radio base station according to this embodiment.

FIG. 7 is a diagram illustrating an example of the functional structure of a radio base station according to this embodiment. It should be noted that FIG. 7 mainly illustrates function blocks which are characteristics of this embodiment, and the radio base station 10 includes other function blocks required for radio communication. As illustrated in FIG. 7, the baseband signal processing section 104 includes a control section (scheduler) 301, a transmission signal generating section 302, a mapping section 303, a reception signal processing section 304, and a measurement section 305.

The control section (scheduler) 301 controls the entire radio base station 10. It should be noted that when one control section (scheduler) 301 performs scheduling for licensed bands and unlicensed bands, the control section 301 controls communication of licensed band cells and unlicensed band cells. The control section 301 can be a controller, a control circuit, or a control device based on common understanding within the technical field of the present invention.

The control section 301 controls, for example, generation of downlink signals by the transmission signal generating section 302 and assignment of downlink signals by the mapping section 303. The control section 301 also controls signal reception processing in the reception signal processing section 304 and signal measurement in the measurement section 305.

The control section 301 controls scheduling, generation, mapping, transmission, and the like of downlink signals (e.g., system information, PDCCHs/EPDCCHs and PDSCHs for transmitting DCI, downlink reference signals, synchronization signals). In addition, the control section 301 controls LBT (listening) performed by the measurement section 305 and then controls transmission of downlink signals to the transmission signal generating section 302 and the mapping section 303 in accordance with the LBT results.

The control section 301 may control the transmitting/receiving section 103 and the like such that, for user terminal subjected to listening before UL transmission, the radio base station receives a UL signal assigned to disable transmission of at least one symbol in a UL subframe, in accordance with the results of listening.

Under control by the control section 301, in user terminal, control information (first embodiment) that defines the number of symbols for partial subframe transmission may be transmitted. Under control by the control section 301, which transmission scheme, full-subframe transmission or partial subframe transmission, is used may be dynamically indicated for UL subframe configuration information (information on UL configuration) every subframe during UL transmission (second embodiment). Control by the control section 301 may allow such UL subframe configuration information to be transmitted to user terminal through at least one of higher-layer signaling and a DL control signal and a common DL control signal for UL scheduling.

Under control by the control section 301 during partial subframe transmission, an SRS assigned to one symbol (third embodiment) may be received and channel estimation may be performed based on this signal. Under control by the control section 301, in user terminal, UL transport block assignment may be performed based on an MCS field, a PRB number, and the number of symbols that can be assigned in PUSCH UL transmission (fourth embodiment).

The transmission signal generating section 302 generates downlink signals in accordance with instructions from the control section 301 and feeds them to the mapping section 303. The transmission signal generating section 302 can be a signal generator, a signal generating circuit, or a signal generating device based on common understanding within the technical field of the present invention.

The transmission signal generating section 302 generates, for example, assignment information for downlink resources (DL assignment) and assignment information for uplink resources (UL grants) in accordance with instructions from the control section 301. Downlink data signals are subjected to coding and demodulation in accordance with the coding rate, the demodulation scheme, and the like determined in accordance with the results of CSI measurement in each piece of user terminal 20. The transmission signal generating section 302 also generates DRSs including PSSs, SSSs, CRSs, and CSI-RSs.

The mapping section 303 maps a downlink signal generated in the transmission signal generating section 302 to a predetermined radio resource in accordance with an instruction from the control section 301 and feeds the result to the transmitting/receiving section 103. The mapping section 303 can be a mapper, a mapping circuit, or a mapping device based on common understanding within the technical field of the present invention.

The reception signal processing section 304 subjects reception signals sent from the transmitting/receiving section 103 to reception processing (e.g., demapping, demodulation, and decoding). Here, a reception signal is, for example, an uplink signal transmitted from user terminal 20. The reception signal processing section 304 can be a signal processor, a signal processing circuit, or a signal processing device based on common understanding within the technical field of the present invention.

The reception signal processing section 304 feeds information decoded in reception processing to the control section 301. For example, upon reception of a PUCCH including HARQ-ACK, it feeds HARQ-ACK to the control section 301. In addition, the reception signal processing section 304 feeds reception signals and signals resulting from reception processing to the measurement section 305.

The measurement section 305 performs measurement related to received signals. The measurement section 305 can be a measure, a measurement circuit, or a measurement device based on common understanding within the technical field of the present invention.

The measurement section 305 performs LBT through a carrier (e.g., an unlicensed band) selected for LBT (listening), in accordance with an instruction from the control section 301, and then feeds the LBT results (e.g., determination of in which channel state (idle or busy) it is) to the control section 301.

In addition, the measurement section 305 may measure, for example, the reception power (e.g., reference signal received power (RSRP)), reception quality (e.g., reference signal received quality (RSRQ)), and channel states of received signals. The measurement results may be sent to the control section 301.

<User Terminal>

Figure 8:
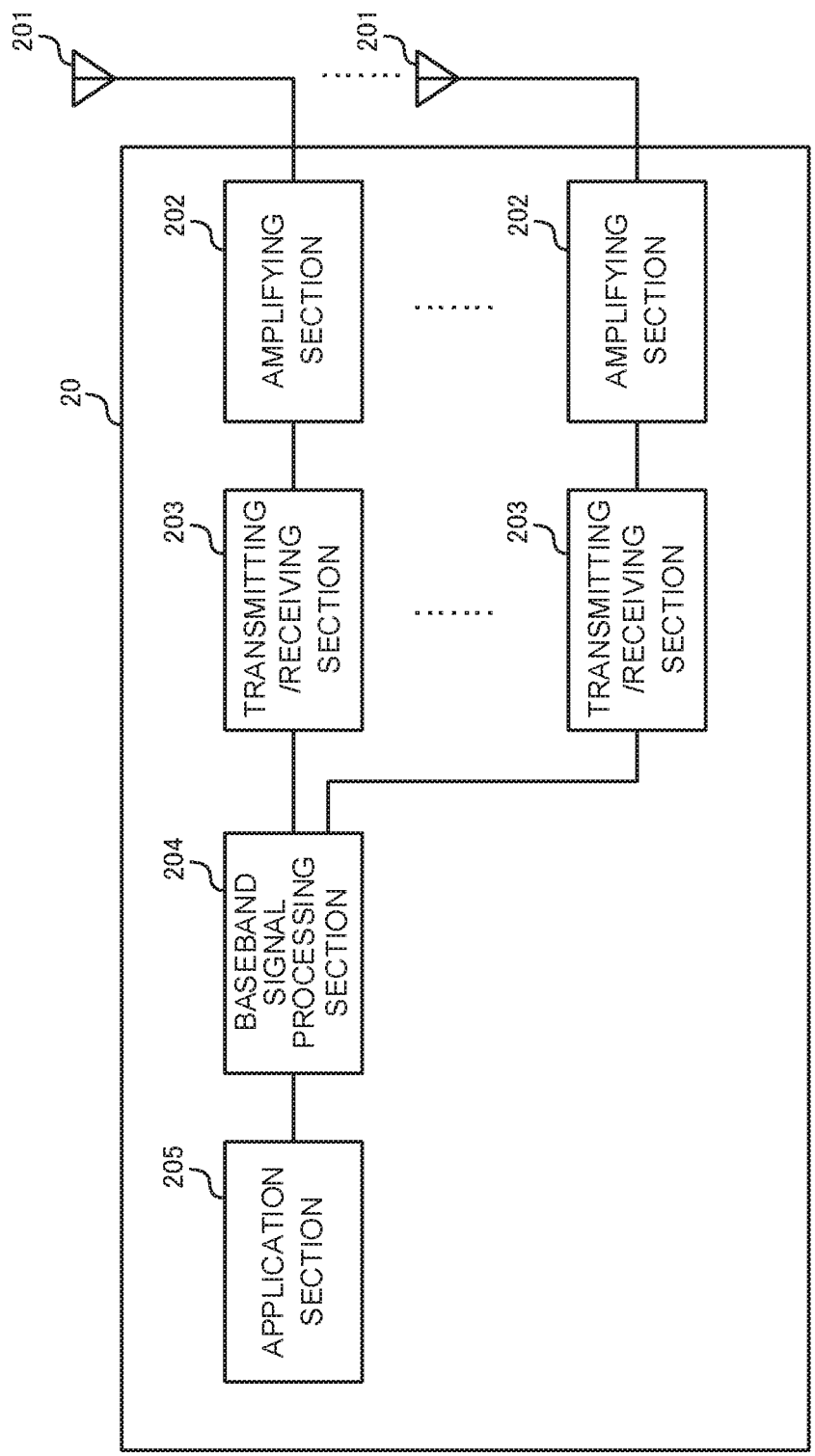
FIG. 8 is a diagram illustrating an example of the overall configuration of user terminal according to this embodiment.

FIG. 8 is a diagram illustrating an example of the overall configuration of user terminal according to this embodiment. The user terminal 20 includes a plurality of transmitting/receiving antennas 201, amplifying sections 202, transmitting/receiving sections 203, a baseband signal processing section 204, and an application section 205. It should be noted that it includes one or more transmitting/receiving antennas 201, one or more amplifying sections 202, and one or more transmitting/receiving sections 203.

Radio-frequency signals received at the transmitting/receiving antennas 201 are amplified in the amplifying sections 202. Each transmitting/receiving section 203 receives downlink signals amplified in the amplifying section 202. The transmitting/receiving section 203 frequency-inverts the received signals to baseband signals and feed them to the baseband signal processing section 204. The transmitting/receiving section 203 may be able to transmit and receive uplink/downlink signals in an unlicensed band. It should be noted that the transmitting/receiving section 203 may be able to transmit and receive uplink/downlink signals in a licensed band.

Each transmitting/receiving section 203 is a transmitter/receiver, transmitting/receiving circuit, or a transmitting/receiving device based on common understanding within the technical field of the present invention. It should be noted that the transmitting/receiving section 203 may be a combination transmitting/receiving section or consist of a transmitting section and a receiving section.

The baseband signal processing section 204 subjects input baseband signals to reception processing, such as FFT processing, error correction decoding, and retransmission control. Downlink user data is transferred to the application section 205. The application section 205 performs processing related to layers higher than physical layers and MAC layers. Broadcast information in downlink data is also transferred to the application section 205.

Meanwhile, uplink user data is input from the application section 205 to the baseband signal processing section 204. The baseband signal processing section 204 performs retransmission control transmission processing (e.g., transmission processing of HARQ), channel coding, pre-coding, discrete Fourier transform (DFT) processing, inverse fast Fourier transform (IFFT) processing, and the like, and the results are transferred to each transmitting/receiving section 203. Each transmitting/receiving section 203 inverts a baseband signal, which is output from the base band signal processing section 204, to a radio-frequency signal and transfers it. The radio-frequency signal which is frequency-inverted by the transmitting/receiving section 203 is amplified by the amplifying section 202 and then transmitted through the transmitting/receiving antenna 201.

The transmitting/receiving section 203 receives downlink signals from a radio base station 10 in at least an unlicensed band. For example, the transmitting/receiving section 203 receives measurement reference signals in an unlicensed band.

The transmitting/receiving section 203 transmits uplink signals to a radio base station 10 in at least an unlicensed band. For example, the transmitting/receiving section 203 may transmit a PUSCH by using an uplink resource assigned with DCI (an UL grant). The transmitting/receiving section 203 may transmit CSI designated by an A-CSI trigger in the DCI (UL grant).

Figure 9:
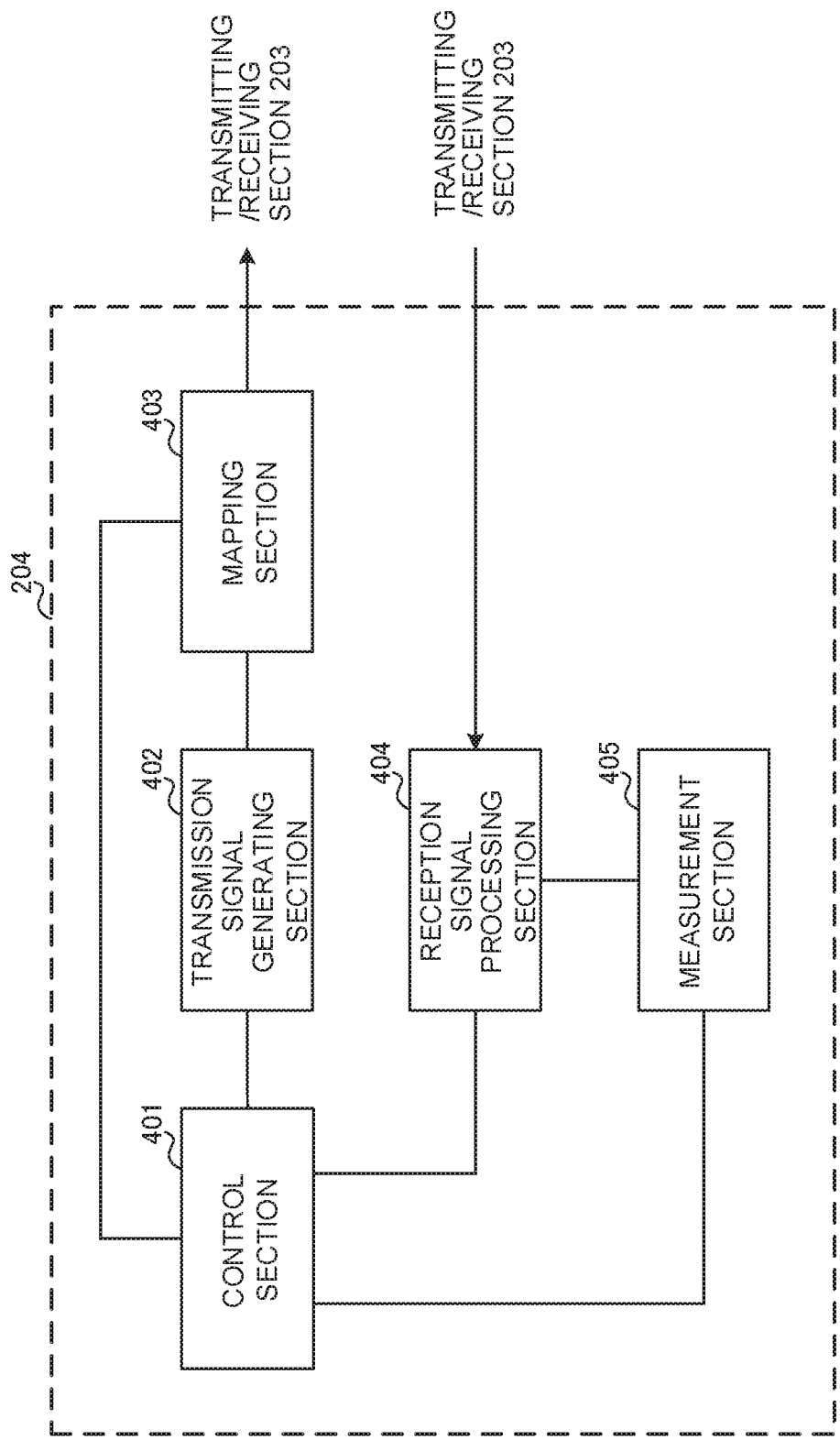
FIG. 9 is a diagram illustrating an example of the functional configuration of user terminal according to this embodiment.

FIG. 9 is a diagram illustrating an example of the functional configuration of user terminal according to this embodiment. It should be noted that FIG. 9 mainly illustrates function blocks which are characteristics of this embodiment, and the user terminal 20 includes other function blocks required for radio communication. As illustrated in FIG. 9, the baseband signal processing section 204 in the user terminal 20 includes at least a control section 401, a transmission signal generating section 402, a mapping section 403, a reception signal processing section 404, and a measurement section 405.

The control section 401 controls the entire user terminal 20. The control section 401 can be a controller, a control circuit, or a control device based on common understanding within the technical field of the present invention.

The control section 401 controls, for example, generation of uplink signals by the transmission signal generating section 402 and assignment of uplink signals by the mapping section 403. The control section 401 also controls downlink signal reception processing in the reception signal processing section 404 and signal measurement in the measurement section 405.

The control section 401 acquires downlink signals transmitted from the radio base station 10 (e.g., PDCCHs/EPDCCHs, PDSCHs, downlink reference signals, and synchronization signals), from the reception signal processing section 404. The control section 401 controls generation of uplink signals (e.g., PUCCHs and PUSCHs) in accordance with DCI contained in PDCCHs/EPDCCHs (downlink control signals) and the results of demodulation of PDSCHs (downlink data signals).

The control section 401 may control UL signal assignment such that listening is performed before UL signal transmission and transmission of at least one symbol in a UL subframe is disabled in accordance with the results of the listening. When a UL signal is transmitted in a sequence of UL subframes, the control section 401 may control UL signal assignment such that transmission of at least one symbol in the last UL subframe is disabled.

For example, under control by the control section 401, the last subframe for UL transmission automatically uses partial subframe transmission and an UL signal is assigned to symbols in this subframe (first embodiment). In UL transmission using burst transmission, the last subframe uses partial subframe transmission and the other subframes use full-subframe transmission under control by the control section 401. When a single subframe is designated by a UL grant, the designated subframe uses partial subframe transmission under control by the control section 401.

Under control by the control section 401, a transmission scheme of full-subframe transmission or partial subframe transmission is used every subframe during UL transmission in accordance with UL subframe configuration information (information on UL configuration) sent from a radio base station (second embodiment). The control section 401 may control the number of symbols for partial subframe transmission in accordance with UL subframe configuration information so that the gap length for LBT (listening) can be controlled.

In addition, under control by the control section 401, the opportunity of transmitting SRSs may be ensured even if partial subframe transmission is used (third embodiment). For example, when a symbol just before a subframe for transmitting a PUSCH is available, under control by the control section 401, an SRS may be transmitted through this symbol or the last symbol of the subframe for transmitting the PUSCH.

Under control by the control section 401, UL transport block assignment may be performed based on an MCS field, a PRS number, and the number of symbols that can be assigned in PUSCH UL transmission (fourth embodiment).

The control section 401 controls the reception signal processing section 404 and the measurement section 405 such that RRM measurement and/or CSI measurement is performed using a measurement reference signal in an unlicensed band. It should be noted that RRM measurement may be performed using DRSs. Further, the measurement reference signal may be CSI included in a CRS, a CSI-RS, or a DRS, or a CSI-RS.

The transmission signal generating section 402 generates uplink signals (e.g., PUSCHs, PUCCHs, and uplink reference signals) in accordance with instructions from the control section 401 and feeds them to the mapping section 403. The transmission signal generating section 402 can be a signal generator, a signal generating circuit, or a signal generating device based on common understanding within the technical field of the present invention. For example, the control section 401 instructs the transmission signal generating section 402 to generate a PUSCH when the downlink control signal transmitted from the radio base station 10 includes DCI (an UL grant) addressed to user terminal 20.

The mapping section 403 maps an uplink signal generated in the transmission signal generating section 402 to a radio resource in accordance with an instruction from the control section 401 and feeds the result to the transmitting/receiving section 203. The mapping section 403 can be a mapper, a mapping circuit, or a mapping device based on common understanding within the technical field of the present invention.

The reception signal processing section 404 subjects reception signals sent from the transmitting/receiving section 203 to reception processing (e.g., demapping, demodulation, and decoding). Here, the reception signal is, for example, a downlink signal transmitted from the radio base station 10. The reception signal processing section 404 can be a signal processor, a signal processing circuit, or a signal processing device based on common understanding within the technical field of the present invention. The reception signal processing section 404 may be a receiving section according to the present invention.

The reception signal processing section 404 feeds information decoded in reception processing to the control section 401. The reception signal processing section 404 feeds, for example, broadcast information, system information, RRC signaling, and DCI to the control section 401. In addition, the reception signal processing section 404 feeds reception signals and signals resulting from reception processing to the measurement section 405.

The measurement section 405 performs measurement related to received signals. The measurement section 405 can be a measure, a measurement circuit, or a measurement device based on common understanding within the technical field of the present invention.

The measurement section 405 may perform LBT through a carrier (e.g., an unlicensed band) selected for LBT, in accordance with an instruction from the control section 401. The measurement section 405 may feed the LBT result (e.g., determination of which channel state (idle or busy) it is) to the control section 401.

The measurement section 405 performs RRM measurement and CSI measurement in accordance with an instruction from the control section 401. For example, the measurement section 405 performs CSI measurement by using a measurement reference signal (a CRS, a CSI-RS, a CRS including a DRS, or a CSI-RS for CSI measurement in a DRS transmission subframe). The measurement results are output to the control section 401 and then transmitted from the transmitting/receiving section 103 through a PUSCH or PUCCH.

(Hardware Configuration)

It should be noted that the block diagrams used for describing the aforementioned embodiments illustrate one function as one block. These function blocks (configuration parts) are achieved by a given combination of hardware and/or software. Each function block can be achieved by any means. In particular, each function block may be achieved by physically combined one device or multiple devices, specifically, two or more physically separated devices wired or connected wirelessly.

Figure 10:
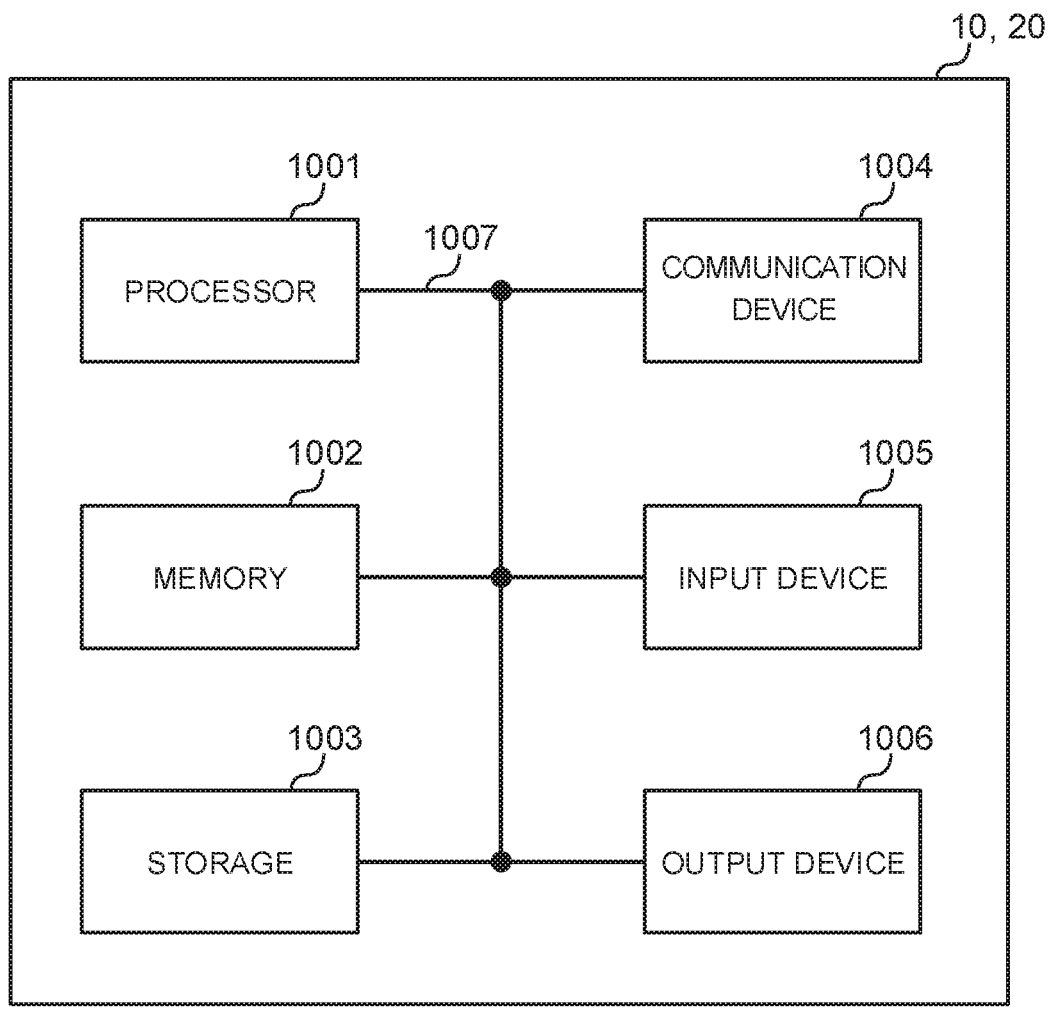
FIG. 10 is a diagram illustrating an example of the hardware configuration of a radio base station and user terminal according to this embodiment.

For example, a radio base station, user terminal, and other components according to one embodiment of the present invention may function as a computer for processing in a radio communication method of the present invention. FIG. 10 is a diagram illustrating an example of the hardware configuration of a radio base station and user terminal according to one embodiment of the present invention. The aforementioned radio base station 10 and the user terminal 20 may be physically configured as a computer device including a processor 1001, a memory 1002, a storage 1003, a communication device 1004, an input device 1005, an output device 1006, and a bus 1007.

In the description below, the term "device" can be replaced with circuit or unit. The hardware configuration of the radio base station 10 and the user terminal 20 may include one or more devices illustrated in the drawings or include not all these devices.

The functions of the radio base station 10 and the user terminal 20 are composed of the processor 1001, the memory 1002, and other hardware installed with predetermined software (programs) and achieved by the fact that the processor 1001 performs computation, the communication device 1004 provides communication, and data reading and/or writing in the memory 1002 and the storage 1003 is controlled.

The processor 1001 entirely controls the computer by operating, an operating system. The processor 1001 may be a central processing unit (CPU) including an interface with peripheral devices, a control device, a computing device, and a register. For example, the aforementioned baseband signal processing section 104 (204), the call processing section 105, and other sections may be achieved by the processor 1001.

The processor 1001 reads programs (program codes), software modules, and data from the storage 1003 and/or the communication device 1004 and sends them to the memory 1002, and various processing is carried out in accordance with them. The programs are programs for instructing the computer to carry out at least part of the operations explained in the aforementioned embodiments. For example, the control section 401 in the user terminal 20 may be achieved by control programs which are stored in the memory 1002 and operate with the processor 1001. The other function blocks may also be operated in the same manner.

The memory 1002 is a computer-readable recording medium, for example, at least one of read only memory (ROM), erasable programmable ROM (EPROM), and random access memory (RAM). The memory 1002 may also be referred to as a register, cash, or main memory (main storage device). The memory 1002 can store programs (program codes), software modules, and the like that can be executed for implementing a radio communication method according to one embodiment of the present invention.

The storage 1003 may be a computer-readable recording medium, for example, at least one of compact disc ROM (CD-ROM) or other optical discs, hard disc drives, flexible discs, magneto-optical discs, flash memory. The storage 1003 may also be referred to as an auxiliary memory device.

The communication device 1004 is hardware (transmission/reception device) for communication between computers via wires and/or a radio network, e.g., a network device, a network controller, a network card, or a communication module. For example, the aforementioned transmitting/receiving antenna 101 (201), amplifying section 102 (202), transmitting/receiving section 103 (203), transfer path interface 106, and the like may be achieved by the communication device 1004.

The input device 1005 is an input device receiving inputs from external devices (e.g., keyboard and mouse). The output device 1006 is an output device producing outputs to external devices (e.g., display and speaker). It should be noted that the input device 1005 and the output device 1006 may be integrated into one piece (e.g., touchscreen).

The processor 1001, the memory 1002, and other devices are connected to each other by the bus 1007 for information communication. The bus 1007 may be a single bus or different buses for different devices.

The radio base station 10 and the user terminal 20 may include a microprocessor, a digital signal processor (DSP), an application specific integrated circuit (ASIC), a programmable logic device (PLD), a field programmable gate array (FPGA), and other hardware, and part or all of each function block may be achieved by the hardware. For example, the processor 1001 may contain at least one of these pieces of hardware.

It should be noted that terms described in this specification and/or the terms necessary for understanding of this specification may be replaced with terms having the same or similar meanings. For example, "channel" and/or "symbol" may be replaced with "signal (signaling)". "Signal" may be replaced with "message". "Component carrier (CC)" may be referred to as "cell", "frequency carrier", or "carrier frequency".

A radio frame may consist of one or more periods (frames) in the time domain. The at least one or more periods (frames) forming the radio frame may be referred to as "subframe". A subframe may consist of one or more slots in the time domain. A slot may consist of one or more symbols (e.g., OFDM symbols and SC-FDMA symbols) in the time domain.

A radio frame, a subframe, a slot, and a symbol represent time sections during signal transmission. A radio frame, a subframe, a slot, and a symbol may have alternative names. For example, one subframe may be referred to as a transmission time interval (TTI), a sequence of subframes as a TTI, and one slot as a TTI. To be specific, a subframe or TTI may be a subframe (1 ms), a period shorter than 1 ms (e.g., 1 to 13 symbols), or a period longer than 1 ms in existing LTE.

Here, a TTI refers to, for example, a minimum time section in scheduling for radio communication. For example, in an LTE system, a radio base station performs scheduling for TTI-based assignment of a radio resource (e.g., a frequency band width or transmission power that can be used for each piece of user terminal) to each piece of user terminal. It should be noted that the definition of TTI is not limited to this.

A 1-ms TTI may be referred to as, for example, a regular TTI (a TTI according to LTE Rel.8-12), a normal TTI, a long TTI, a regular subframe, a normal subframe, or a long subframe. A TTI shorter than a regular TTI may be referred to as a short TTI or a short subframe.

A resource block (RB) is a resource assignment section in the time domain and the frequency domain and may include a sequence of one or more sub-carriers in the frequency domain. An RB may include one or more symbols in the time domain and may have a length of one slot, one sub-frame, or one TTI. One TTI and one sub-frame may each consist of one or more resource blocks. It should be noted that an RB may be referred as, for example, a physical resource block (physical RB or PRB), a PRB pair, and an RB pair.

A resource block may consist of one or more resource elements (REs). For example, one RE may be a radio resource of one sub-carrier and one symbol.

It should be noted that the aforementioned configurations of radio frame, sub-frame, slot, and symbol are illustrative only. For example, the number of sub-frames included in a radio frame, the number of slots included in a sub-frame, the number of symbols and RBs included in a slot, the number of sub-carries included in an RB, and the number of symbols in a TTI, the symbol length, and the cyclic prefix (CP) length can be variously modified.

Information and parameters described in this specification may be represented by absolute values, values relative to predetermined values, or other corresponding information. For example, a radio resource may be indicated by a predetermined index.

Information and signals described in this specification may be expressed by any of different techniques. For example, data, instructions, commands, information, signals, bits, symbols, and chips mentioned throughout the above description may be represented by voltage, current, electromagnetic waves, magnetic fields or magnetic particles, optical fields or photons, or any combination thereof.

Software, instructions, and information may be transmitted and received via a transmission medium. For example, when software is transmitted from websites, servers, or other remote sources through wire connection technology (coaxial cables, optical fiber cables, twisted pair cables and digital subscriber line (DSL)) and/or radio technology (e.g., infrared rays and microwaves), the wire connection technology and/or the radio technology is contained in the definition of a transmission medium.

A radio base station in this specification may be replaced with user terminal. For example, the embodiments of the present invention may be applied to a configuration in which communication between a radio base station and user terminal is replaced with device-to-device (D2D) communication between a plurality of user terminal pieces. In this case, the user terminal 20 may have the same function as the radio base station 10. The terms "uplink" and "downlink" may be replaced with "side". For example, "uplink channel" may be replaced with "side channel".

Similarly, user terminal in this specification may be replaced with a radio base station. In this case, the radio base station 10 may have the same function as the user terminal 20.

The embodiments in this specification can be used alone or in combination or can be switched in actual use. In addition, predetermined information notification (e.g., the notification "being X") is performed not only explicitly but also implicitly (e.g., by not performing this predetermined information notification).

Information notification is not necessarily performed by the methods explained in the embodiments in this specification and may be performed by any other methods. For example, information notification may be performed by physical layer signaling (e.g., downlink control information (DCI), uplink control information (UCI)), higher-layer signaling (e.g., radio resource control (RRC) signaling, broadcast information (master information block (MIB), and system information block (SIB)), and medium access control (MAC) signaling), or other signals, or any combination thereof. RRC signaling may be referred to as an RRC message and may be, for example, an RRC connection setup message, an RRC connection reconfiguration message, or the like. MAC signaling may be sent through, for example, a MAC control element (MAC control element (CE)).

The embodiments described in this specification may be applied to systems using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), New-radio access technology (RAT), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate radio communication methods, and/or next-generation systems extended based on them.

The processes, sequences, and flow charts according to the embodiments in this specification may be changed in a consistent way. For example, the methods described in this specification suggests various steps in an illustrative order and does not exclusively suggest this particular order.

The present invention has been described in detail but it is clear to those skilled in the art that the present invention should not be limited to the embodiments described in this specification. For example, these embodiments may be used alone or in combination. The present invention can be implemented in the forms of embodiments amended or modified without departing from the spirit and scope of the invention defined by the claims. Therefore, the description in this specification is used for giving examples and does not impose any limits to the present invention.

The invention claimed is:

1. A terminal comprising:
   a receiver that receives a downlink (DL) signal;
   a transmitter that transmits a physical uplink shared channel (PUSCH) and a sounding reference signal (SRS); and
   a processor that controls the transmitter to transmit each of the PUSCH and the SRS in accordance with a downlink control information (DCI) included in the DL signal, the SRS being triggered by the DCI,
   wherein the processor allocates the PUSCH to symbols in an uplink (UL) subframe except the last one or more symbols in the UL subframe, and transmits the PUSCH following transmission of the SRS, based on the DCI included in the DL signal, and
   wherein the processor performs listening prior to the transmission of the SRS.

2. The terminal according to claim 1, wherein a time required for the listening varies depending on a value of a contention window size.

3. A radio base station comprising:
   a transmitter that transmits, to a terminal, a downlink (DL) signal including downlink control information (DCI) to trigger each of transmission of a physical uplink shared channel (PUSCH) and transmission of a sounding reference signal (SRS); and
   a receiver that receives the PUSCH and the SRS that are transmitted from the terminal in accordance with the DCI such that the PUSCH is received after the SRS, wherein the transmitter transmits, to the terminal, the DL signal including the DCI to allocate the PUSCH to symbols in an uplink (UL) subframe except the last one or more symbols in the UL subframe.

4. A radio communication method performed by a terminal, comprising:

receiving a downlink (DL) signal;

transmitting a physical uplink shared channel (PUSCH) and a sounding reference signal, SRS; and controlling to transmit each of the PUSCH and the SRS in accordance with a downlink control information (DCI) included in the DL signal, the SRS being triggered by the DCI, wherein the terminal allocates the PUSCH to symbols in an uplink (UL) subframe except the last one or more symbols in the UL subframe, and transmits the PUSCH following transmission of the SRS, based on the DCI included in the DL signal, and wherein the terminal performs listening prior to the transmission of the SRS.

5. A system comprising a terminal according to claim 1 and a radio base station according to claim 3.

* * * * *